United States Patent
Ishida

(10) Patent No.: US 9,153,966 B2
(45) Date of Patent: Oct. 6, 2015

(54) POWER GRID CONTROL SYSTEM USING ELECTRIC VEHICLE, POWER GRID CONTROL APPARATUS, INFORMATION DISTRIBUTION APPARATUS, AND INFORMATION DISTRIBUTION METHOD

(75) Inventor: Takaharu Ishida, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 701 days.

(21) Appl. No.: 13/394,264

(22) PCT Filed: Aug. 24, 2010

(86) PCT No.: PCT/JP2010/064267
§ 371 (c)(1),
(2), (4) Date: Mar. 5, 2012

(87) PCT Pub. No.: WO2011/077780
PCT Pub. Date: Jun. 30, 2011

(65) Prior Publication Data
US 2012/0249068 A1 Oct. 4, 2012

(30) Foreign Application Priority Data
Dec. 24, 2009 (JP) ................................. 2009-292921

(51) Int. Cl.
*H02J 7/00* (2006.01)
*H02J 3/32* (2006.01)
(Continued)

(52) U.S. Cl.
CPC ............... *H02J 3/32* (2013.01); *B60L 11/1816* (2013.01); *B60L 11/1838* (2013.01);
(Continued)

(58) Field of Classification Search
CPC ..... H02J 7/0027; Y02T 90/14; Y02T 90/128; Y02T 90/163; Y02E 60/721; B60L 11/1842; B60L 11/1844
USPC ......................................... 320/104, 109, 134
See application file for complete search history.

(56) References Cited

U.S. PATENT DOCUMENTS

| | | | |
|---|---|---|---|
| 8,063,605 B2 | 11/2011 | Tonegawa et al. | |
| 2009/0066287 A1* | 3/2009 | Pollack et al. | 320/101 |
| 2011/0084664 A1* | 4/2011 | White et al. | 320/134 |

FOREIGN PATENT DOCUMENTS

| | | |
|---|---|---|
| DE | 20 2009 000 259 U1 | 3/2009 |
| JP | 2007-185083 A | 7/2007 |

(Continued)

OTHER PUBLICATIONS

Japanese Office Action Dated Sep. 9, 2013 (two (2) pages).
(Continued)

*Primary Examiner* — Edward Tso
*Assistant Examiner* — Aaron Piggush
(74) *Attorney, Agent, or Firm* — Crowell & Moring LLP

(57) ABSTRACT

Provided are charging/discharging spots which are connected to a power grid and which charge storage batteries of electric vehicles connected thereto and discharge charged power of the storage batteries to the power grid; a data center which collects and stores current position information of electric vehicles located in a territory and charging state information of storage batteries of the electric vehicles; and a power aggregator which ranks degrees of necessity of charging/discharging the storage batteries of the respective electric vehicles based on the stored position information, the charging state information of the storage batteries and position information of the charging/discharging spots and creates a ranking list indicating the ranks. The power aggregator distributes information for guiding each of the electric vehicles to a designated one of the charging/discharging spots for charging or discharging in accordance with the ranking list. Accordingly, moving electric vehicles can be guided to charging/discharging spots, so that power charged/discharged on the power grid side can be kept more surely.

7 Claims, 19 Drawing Sheets

(51) Int. Cl.
   *B60L 11/18* (2006.01)
   *G07F 15/00* (2006.01)
   *H01M 10/44* (2006.01)
   *H02J 3/38* (2006.01)

(52) U.S. Cl.
   CPC ........ *B60L 11/1842* (2013.01); *B60L 11/1844* (2013.01); *B60L 11/1846* (2013.01); *B60L 11/1848* (2013.01); *G07F 15/005* (2013.01); *G07F 15/008* (2013.01); *H01M 10/441* (2013.01); *H02J 3/381* (2013.01); *H02J 3/386* (2013.01); *B60L 2230/16* (2013.01); *B60L 2260/56* (2013.01); *H02J 3/383* (2013.01); *Y02E 10/563* (2013.01); *Y02E 10/763* (2013.01); *Y02E 60/721* (2013.01); *Y02E 70/30* (2013.01); *Y02T 10/7005* (2013.01); *Y02T 10/7088* (2013.01); *Y02T 90/121* (2013.01); *Y02T 90/128* (2013.01); *Y02T 90/14* (2013.01); *Y02T 90/163* (2013.01); *Y02T 90/169* (2013.01); *Y04S 10/126* (2013.01); *Y04S 30/14* (2013.01)

(56) References Cited

FOREIGN PATENT DOCUMENTS

| JP | 2007-252117 A | 9/2007 |
| JP | 2008-304337 A | 12/2008 |
| JP | 2009-33808 A | 2/2009 |
| JP | 2009-213240 A | 9/2009 |
| JP | 2009-232670 A | 10/2009 |

OTHER PUBLICATIONS

Corresponding International Search Report with English Translation dated Nov. 22, 2010 (two (2) pages).
Extended European Search Report dated Jun. 3, 2014 (six (6) pages).

* cited by examiner

POWER GRID CONTROL SYSTEM USING ELECTRIC VEHICLE, POWER GRID CONTROL APPARATUS, INFORMATION DISTRIBUTION APPARATUS, AND INFORMATION DISTRIBUTION METHOD

TECHNICAL FIELD

The present invention relates to a power grid control system using electric vehicles. Particularly, it relates to a power grid control system which controls a power grid by using storage batteries mounted in electric vehicles.

BACKGROUND ART

For example, Patent Literature 1 has disclosed a power supply system which can receive power supply from electric vehicles and supply emergency energy in an emergency etc. that the power feeding amount runs short. In this literature, storage batteries of electric vehicles can be connected to a charging/discharging terminal and discharged simultaneously.

CITATION LIST

Patent Literature

Patent Literature 1: JP-A-2007-252117

SUMMARY OF INVENTION

Technical Problem

Although the background art is placed on the assumption that a storage battery of an electric vehicle connected to a power grid through a charging/discharging device set at a charging/discharging spot is used, there is no disclosure about the point that an electric vehicle not connected to the charging/discharging spot is guided to the charging/discharging spot.

It is said that the frequency of use of an electric vehicle is about one hour per day and maximum 60 km in terms of distance. Therefore, when storage batteries of electric vehicles are used to be charged/discharged from/into a power grid, it is thought of that even moving electric vehicles may be chargeable/dischargeable with the passage of a little time.

Accordingly, if incentive is given to such electric vehicles (electric vehicle drivers) to guide the electric vehicles (electric vehicle drivers) to charging/discharging spots, a necessary power amount on the power grid side can be kept from the electric vehicles.

The present invention is accomplished in consideration of these facts. The invention is to provide a power grid control technique or the like which guides moving electric vehicles to charging/discharging spots so that power fed to the power grid side can be kept more surely.

Solution to Problem

The present invention uses the following means to solve the aforementioned problem.

Current position information of electric vehicles located in a territory and charging state information of storage batteries of the electric vehicles are collected and stored, and information for guiding each of the electric vehicles to a designated charging/discharging spot for charging or discharging based on the stored position information, the charge state information of the storage batteries and position information of the charging/discharging spots is distributed.

Advantageous Effects of Invention

Because the present invention has the aforementioned configuration, moving electric vehicles can be guided to charging/discharging spots so that power fed to the power grid side can be kept more surely.

DESCRIPTION OF EMBODIMENTS

[Embodiment 1]

Figure 1:
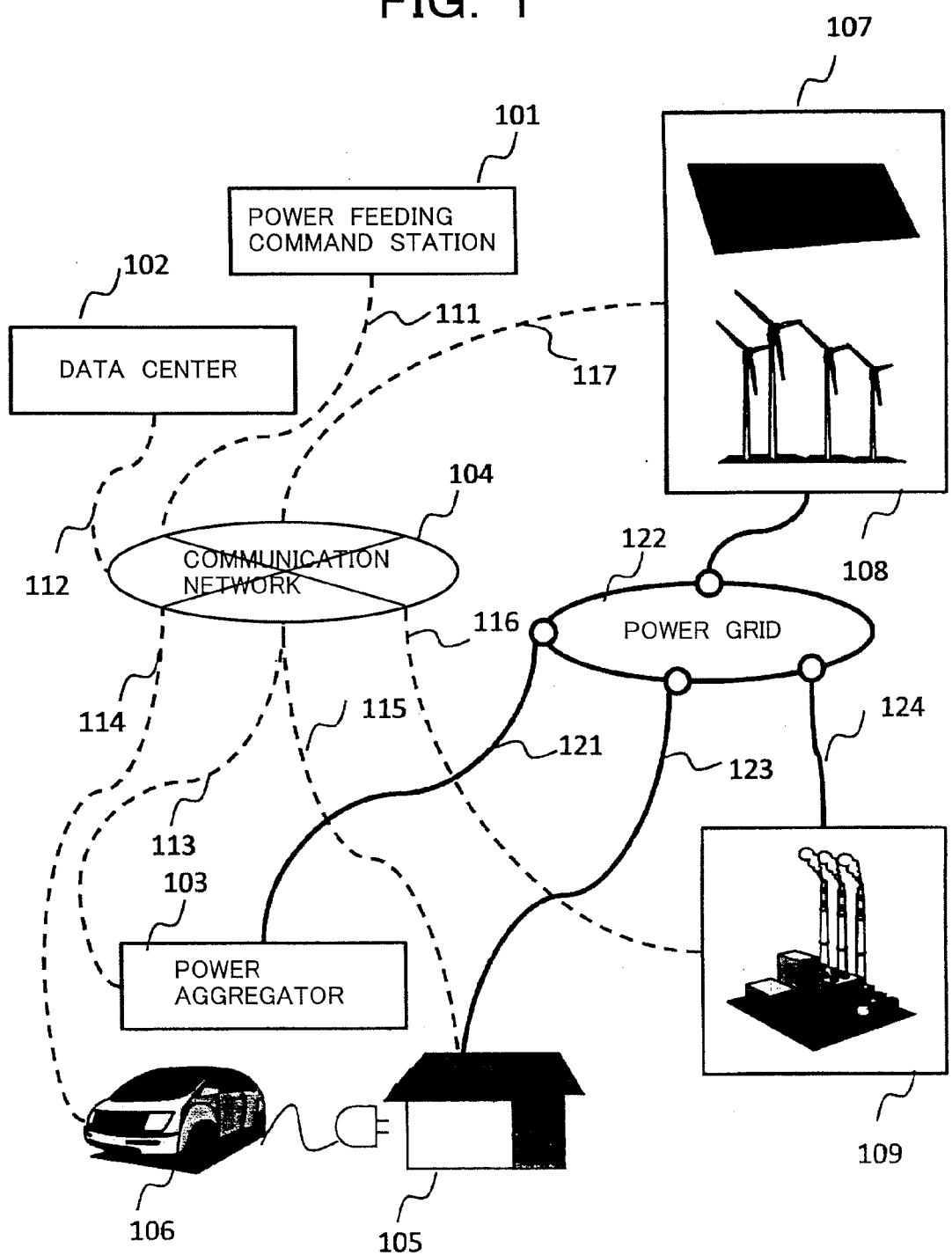
[FIG. 1] A view for explaining an overall configuration of a power grid control system using electric vehicles.

A first embodiment of the invention will be described below with reference to the drawings. FIG. 1 is a view for explaining an overall configuration of a power grid control system using electric vehicles. In the invention, there are provided a power feeding command station 101 which undertakes power feeding and control in a territory, a data center 102 which manages power grid-relevant data such as a history of power flow in a power grid, histories of operation of various devices, and user contract information, a power aggregator 103 which performs management and control instruction of storage batteries of electric vehicles (hereinafter referred to as EVs), a communication network 104, a building 105 as a charging/discharging spot having a charging/discharging device for charging/discharging the EVs, an electric vehicle 106, a solar photovoltaic power generation plant 107, a wind power generation plant 108, a large-scale power supply plant 109 using thermal power, nuclear power, etc., communication lines 111 to 117 for performing communication as to various data in the facilities 101 to 109, and power transmission lines 122 to 124.

Data exchanged between the communication lines 112 to 117 and the communication network are transmitted to the data center through the communication line 111 and converted by the data center in accordance with the purpose which will be described later. The power aggregator 103 is a provider having a function of acquiring information about storage batteries mounted in contracted EVs, collecting the power feeding amount designated by the power feeding command station from the target EVs and designating charging/discharging from/into the power grid.

Figure 2:
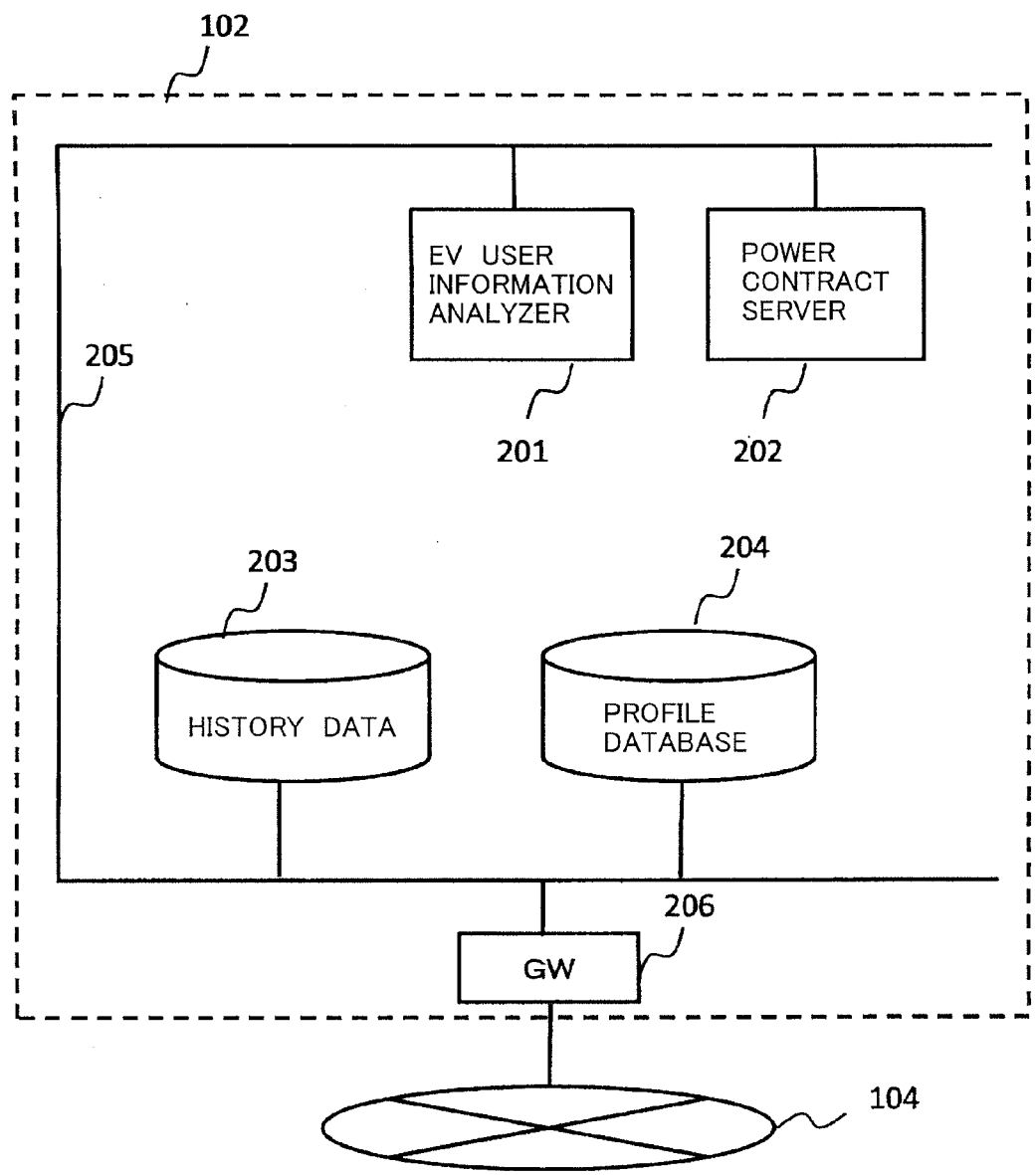
[FIG. 2] A configuration diagram of a data center according to a first embodiment.

FIG. 2 is a configuration diagram of the data center 102. The data center has an EV user analyzer 201, a power contract server 202, a history database 203 which stores history data collected through the communication network 104, profile data 204 generated from the history database by the EV user information analyzer, a communication line 205, and a gateway 206 which serves as an intermediary for connection to the external communication network 104. The gateway 206 has an authentication function necessary for data exchange.

Figure 3:
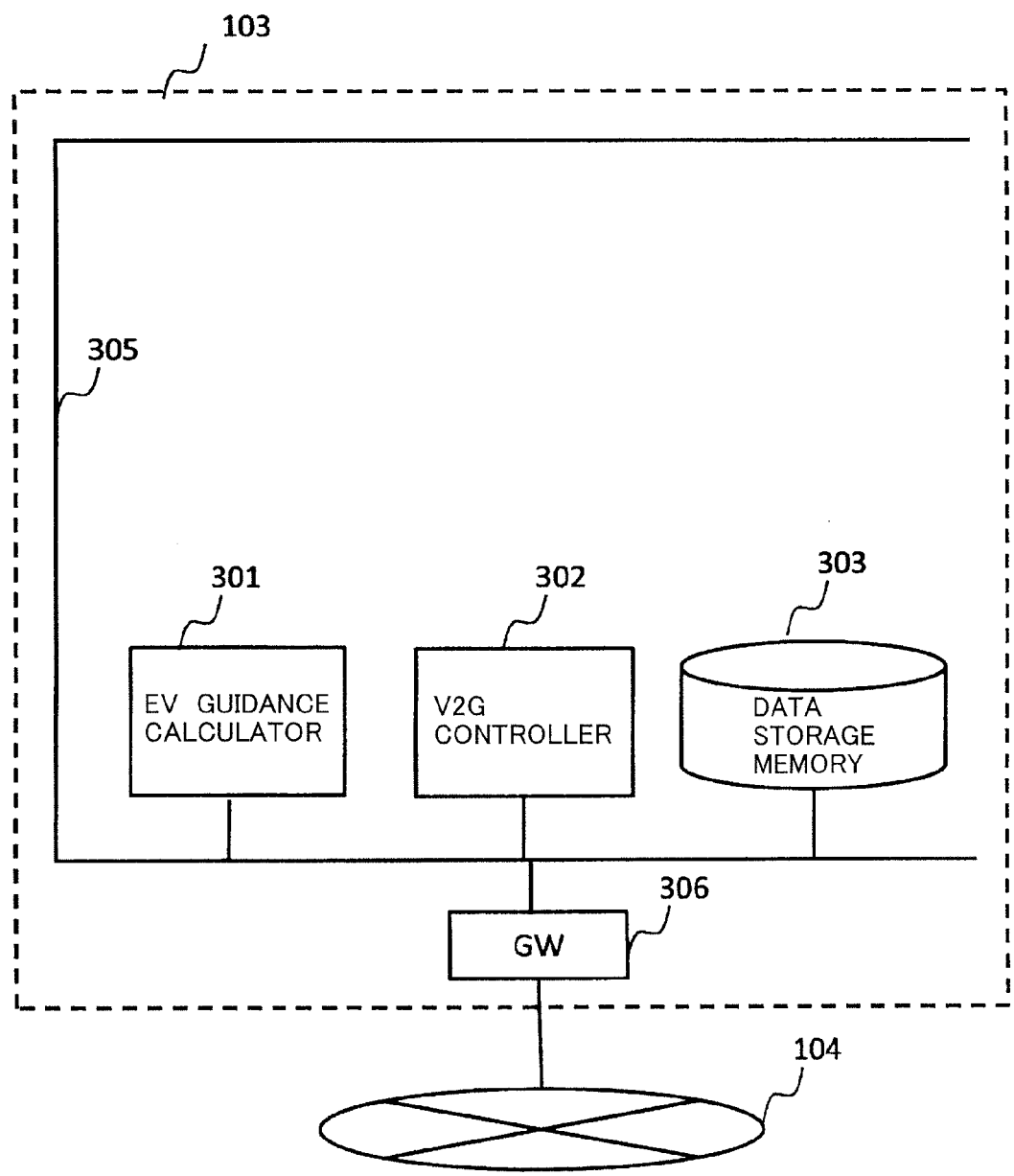
[FIG. 3] A configuration diagram of a power aggregator.

FIG. 3 is a configuration diagram of the power aggregator 103. The power aggregator 103 has an EV guidance calculator 301, a V2G (vehicle to grid: enabling a power grid to be charged/discharged with electric power generated by an electric vehicle) controller 302, a data storage memory 303 which stores data temporarily when the EV guidance calculator and the V2G controller perform arithmetic operation, a communication line 305, and a gateway 306 which serves as an intermediary for connection to the external communication network 104.

Figure 4:
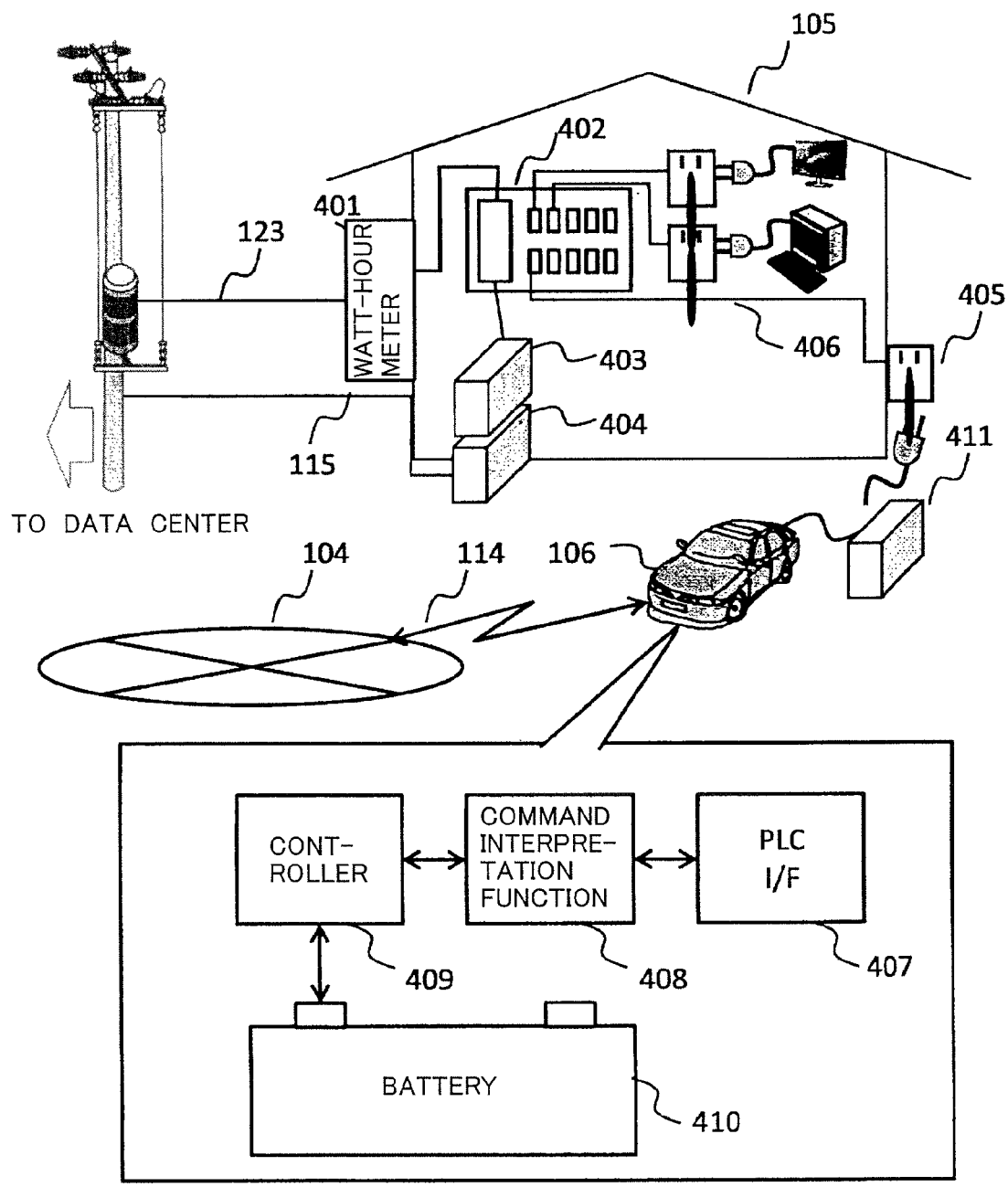
[FIG. 4] A view showing connection between a building and an electric vehicle on the assumption that charging/discharging is performed domestically.

FIG. 4 is a view showing connection between a building and an electric vehicle on the assumption that charging/discharging is performed domestically. Incidentally, the example in this drawing is placed on the assumption that PLC (power line communication) is used because the EV is connected to the inside of a home by a charging plug, and CAN is used as an information network in the EV. The building 105 as a charging/discharging spot has a watt-hour meter 401, a distribution board 402, a PCL modem main device 403, a broad circuit modem 4040, an in-home socket 405, and a PLC modem extension device 411. The EV 106 has a PLC-CAN interface 407, a command interpretation function 408 for interpreting commands transmitted by the PLC or encoding information sent from a battery 410 to the PLC, a controller 409 for controlling the battery, and the battery 410. Data sent from the EV 106 is transmitted to the data center through the PLC modem extension device 411, an in-home electric wiring 406, the PLC modem main device 403, the broad-band modem 404 and the communication line 115. On the other hand, a control command from the power aggregator 103 follows a course opposite to the aforementioned course to control the storage battery of the EV. Power exchange between the storage battery of the EV 105 and the power grid is performed through the in-home socket 405, the in-home electric wiring 406, the power distribution board 402, the watt-hour meter 401 and the power line 123.

Figure 5:
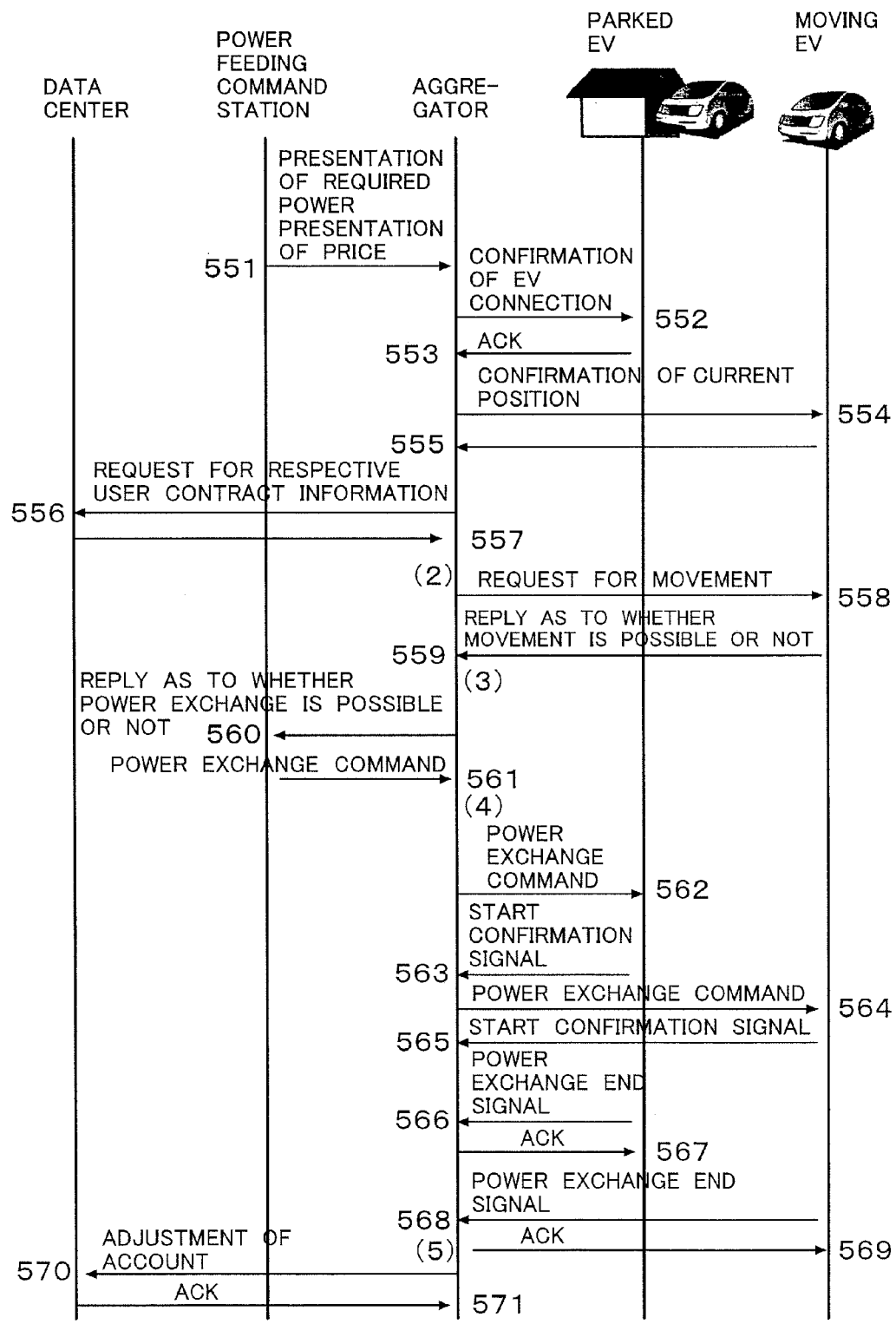
[FIG. 5] A sequence chart showing a procedure of processing performed when a power feeding command station requests the power aggregator to exchange power.

FIG. 5 is a sequence chart showing a procedure of processing performed among the data center, the power feeding command station, the aggregator, the parked EV and the moving EV when the power feeding command station requests the power aggregator to exchange power. In the power feeding command station, a computer system such as a not-shown power demand forecasting system or a not-shown power generator supply capacity forecasting system always monitors power overruns/underruns periodically when power of the EV storage battery is used for stabilizing the frequency because of unbalanced power demand and supply in the power feeding system. When demand-and-supply balance cannot be kept only by facilities under the control of the power feeding command station, the power feeding command station 101 transmits a power feeding command including required overruns/underruns to the aggregator 103 (551). Upon reception of the command, the power aggregator collects whether the charging plug is connected to the in-home socket or not, through the aforementioned communication route for each EV having a contract with the power aggregator in advance (552 and 553). Each unacknowledged EV on this occasion is judged to be moving, and position information indicating the position of the moving EV at that point of time is acquired through the navigation (554 and 555). Then, the power aggregator inquires of the data center the contract information of each EV user and acquires the contract information (556 and 557). At this point of time, the power aggregator calculates whether the power supply overruns/underruns from the power feeding command station can be covered only by the EVs each having the charging plug connected to the in-home socket or not (002). When it is smaller than the amount commanded by the power feeding command station, information added with incentive information is displayed on a navigation screen of each moving EV to thereby ask the EV to move to the nearest charging spot and obtain a reply from the EV (558 and 559). Then, a power distribution is calculated in a state where movable EVs are added based on this reply (003). As a result, whether power corresponding to the command value of the power feeding amount from the power feeding command station can be prepared or not, is transmitted to the power feeding command station, so that a signal indicating reception of this signal is received (560 and 561).

Then, after the power aggregator distributes a power exchange command to each EV through the network 104 and receives a signal of confirmation of each EV's receiving the command (562, 563, 564 and 565), the power aggregator monitors the power exchange amount from each EV in real time. At the point of time that the power exchange amount on each EV side reaches the upper limit of the command value from the power aggregator, the EV transmits a power exchange end signal to the power aggregator. After the power aggregator receives the end signal, the power aggregator transmits a signal indicating acknowledgment of end to each EV (566, 567, 568 and 569). After the EV receives this acknowledge signal, the power aggregator performs postprocessing of the EV side system, that is, a process of transmitting data such as total power charging/discharging amount, execution time, etc. to the data center. After the power aggregator confirms whether the designated power charging/discharging amount is coincident with the total power charging/discharging amount transmitted from each EV or not (005), the power aggregator updates the accounting database of the data center based on data corresponding to the actual results (570) and receives information of update results (571).

A function for achieving the respective functions of (002) to (004) used in the description of FIG. 5 will be described below.

Figure 6:
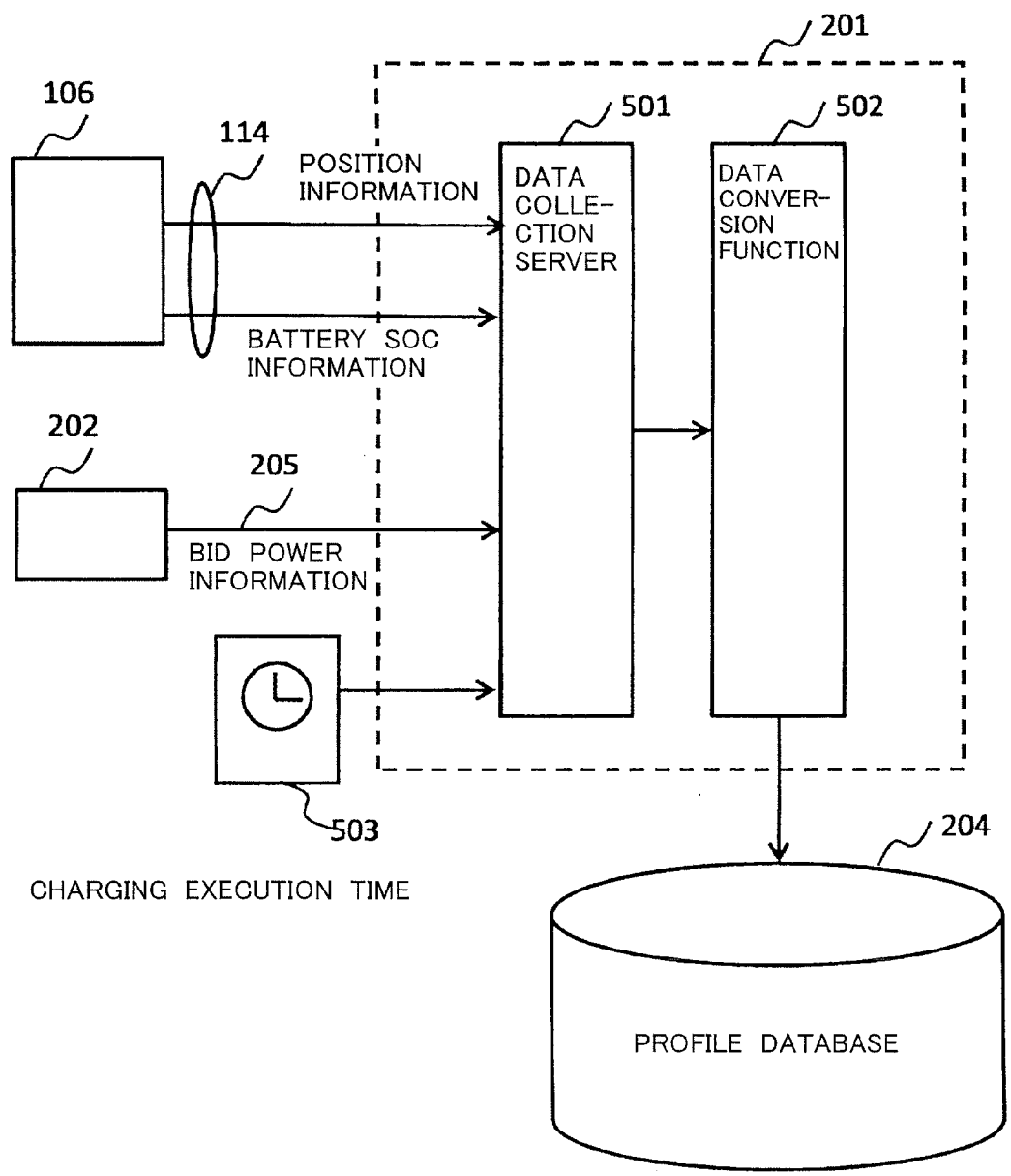
[FIG. 6] A view for explaining a configuration of an EV user information analyzer.

FIG. 6 is a view for explaining the configuration of the EV user information analyzer 201 in the data center 102. The user information analyzer 201 collects information from EVs 106, that is, at least position information and battery SOC (State Of Charge) information by using a data collection server 501 through a communication line 114. The user information analyzer 201 further collects power transaction prices desired by respective EV users from the power contract server 202 through a communication line 205. On the other hand, the user information analyzer 201 acquires collection time from a reference clock 503 by using the data collection server. These collected data are processed in a desired form by a data conversion function 502, so that the processed data are stored in the profile database 204.

Figure 7:
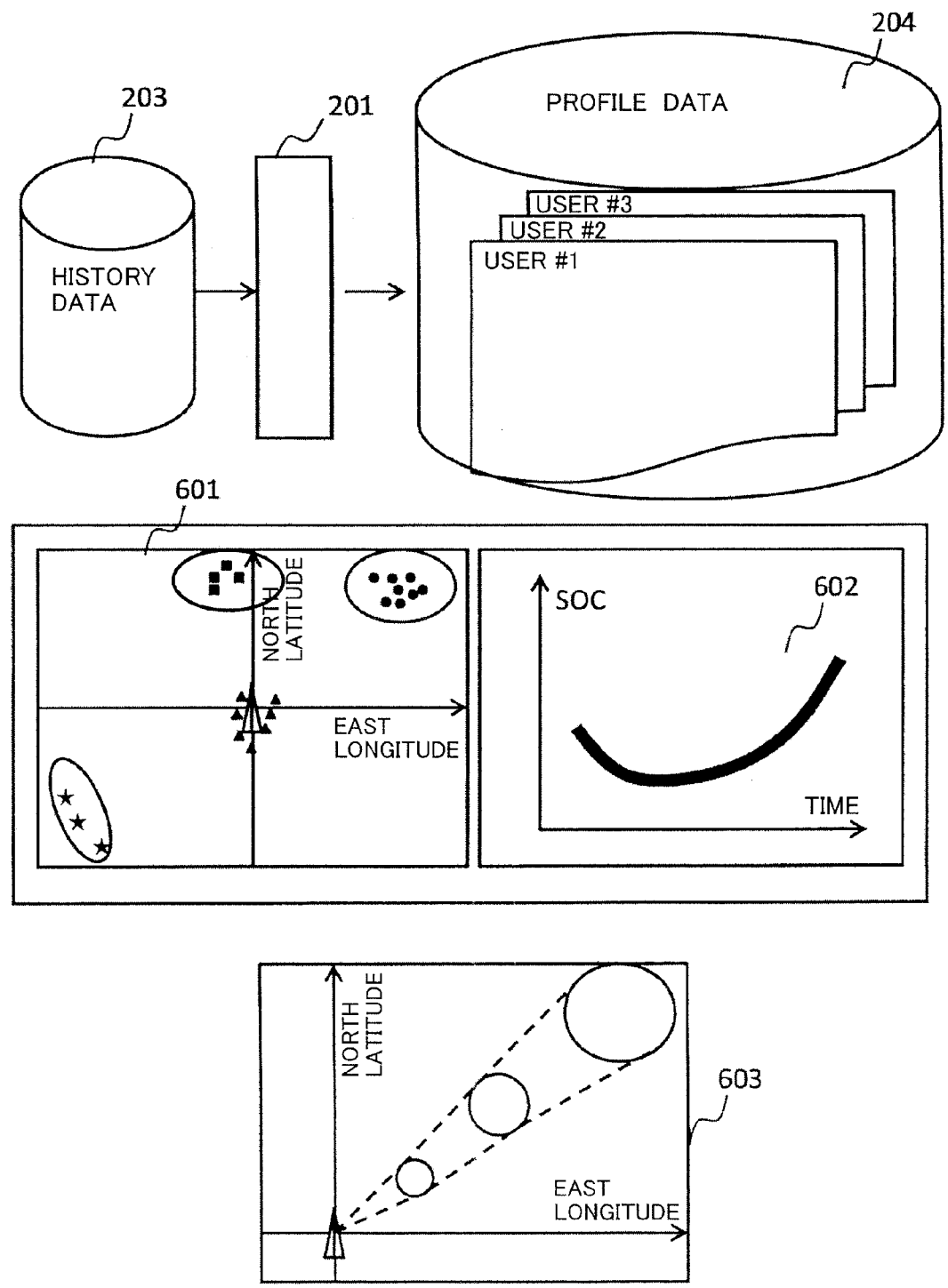
[FIG. 7] A view for explaining the contents of a data conversion function.

FIG. 7 is a view for explaining the contents of the data conversion function 502. Profile data are collected as information according to each EV user by the EV user information analyzer 201 based on data in the history database 203. Here, the profile data are typically plotted and formed on a graph as represented by 601 based on the collected position information and time information. Accordingly, it is possible to know a trend about what time in one day and where each user parks his/her vehicle or which area each user runs his/her vehicle. This trend is clustered only based on position in accordance with each regional category of a high existence probability and then clustered in consideration of time based on the clustered history data. In this manner, each EV user's every-day behavior can be predicted to be utilized for user ranking which indicates which EV users are preferably asked for cooperation when a power feeding command comes from the power feeding command station. The user ranking will be described later.

602 is an example in which SOC changes of each EV in one day are extracted from the history data. If SOC changes in one day can be grasped in terms of charging/running/discharging cycle of each EV, ranking about contribution of the storage battery of each EV to charging/discharging can be obtained. As an example of user profile, running from one arbitrary point to another arbitrary point can be predicted based on the history data. The example shown in 603 is an example in which the probability that the EV will be moved from one arbitrary point to another point after 10 minutes, 20 minutes and 30 minutes is displayed as a future circle image. By using such information, approximate time about the length of time required for connecting the running EV to the power grid when an incentive is given can be estimated.

Besides this, various parameters such as charging/discharging efficiency of each EV, degree of battery degradation, and weather condition such as air temperature can be used for ranking.

Figure 8:
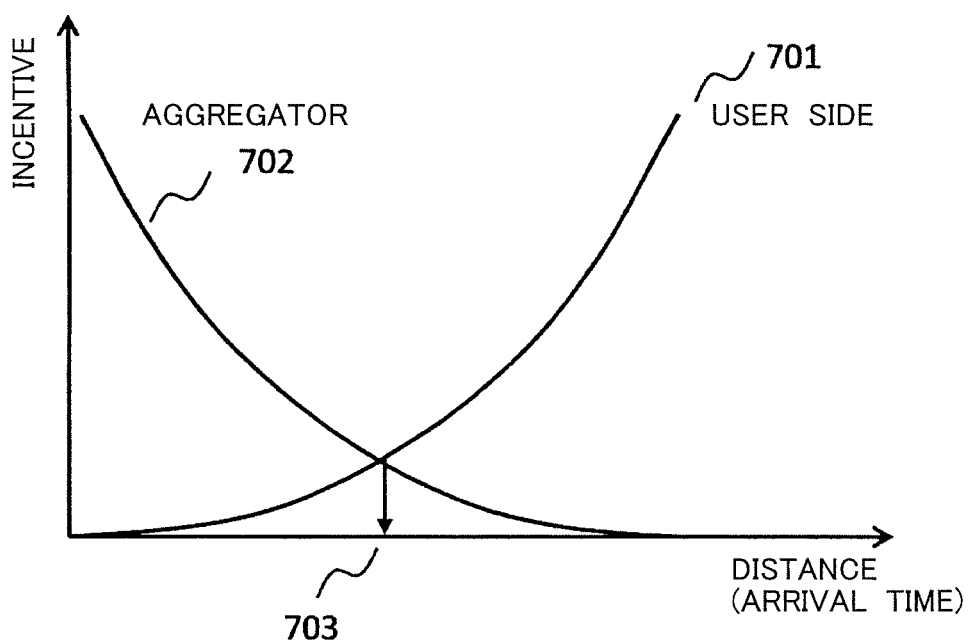
[FIG. 8] A graph for explaining an example in which the power aggregator determines price incentive provided to each moving EV.

FIG. 8 is a graph for explaining an example in which the power aggregator determines price incentive provided to each moving EV when the charging plug of the moving EV is to be connected to the nearest charging/discharging spot for charging/discharging.

As shown in this graph, in view of the user side, a high incentive is required because it will take time and labor when the EV is located at a long distance from the charging/discharging spot or at a point long in arrival time (701). On the other hand, on the aggregator side, there is a tendency to give a high incentive to an EV user short in distance or arrival time because the probability of keeping power becomes higher as the time required for connection of the charging plug to the charging facility from the moving mode becomes shorter (702). Under antinomic benefits of both the sides, the possibility that users near 703 as the distance or arrival time in the demand-supply curve shown in FIG. 8 will cooperate is high, so that the users are rated at a high rank.

Figure 9:
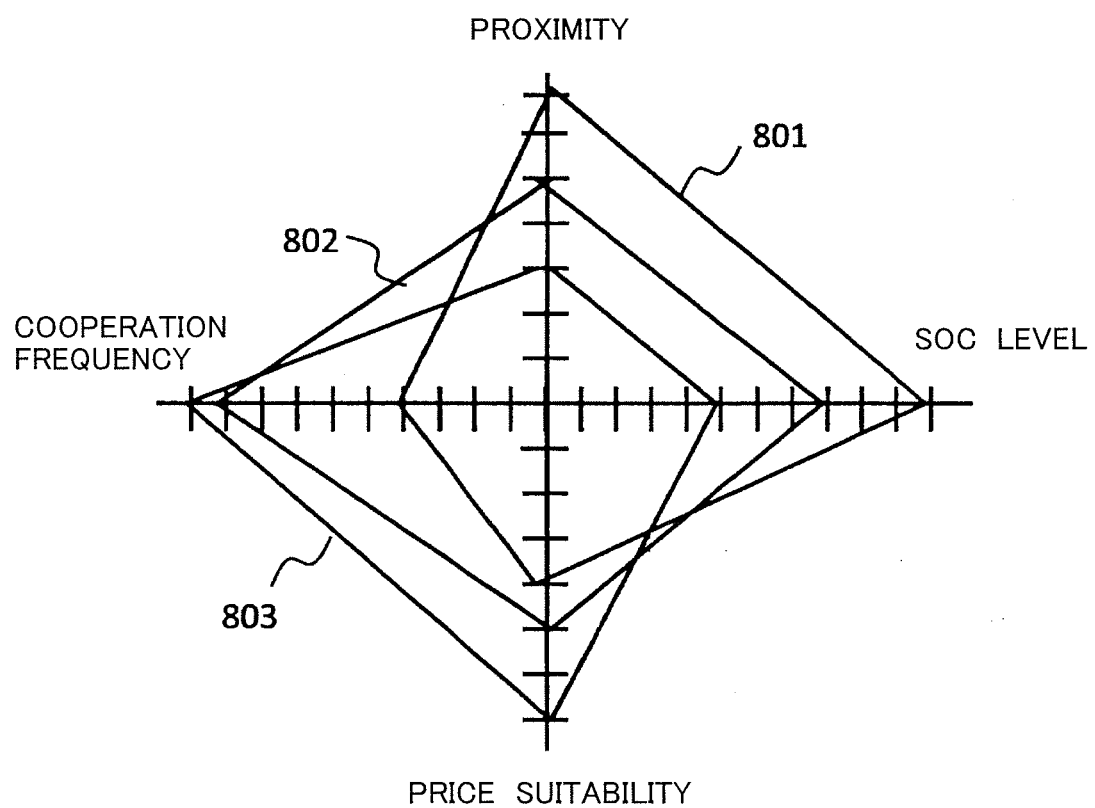
[FIG. 9] A graph for explaining a method of ranking EV users.

FIG. 9 is a graph for explaining a method of ranking EV users by using the EV guidance calculator 301 shown in FIG. 3. Proximity (position) information, SOC level information, price suitability (desired power selling price) information and cooperation frequency described in FIGS. 7 and 8 are set as parameters, so that EV users are ranked based on these parameters. Here, the cooperation frequency is a parameter which is generated based on a cooperation history when the power aggregator recruits EVs to provide power charging/discharging. For example, when the power aggregator requests moving EVs to provide power charging/discharging from the EV storage batteries, there are characteristics in accordance with respective users so that EV users in a relatively near area may not cooperate or EV users in a relatively far area may cooperate to receive a high incentive. For recruit to obtain an effective charging/discharging amount, the aforementioned characteristic according to each user is used as a cooperation frequency which is a ranking parameter. The proximity is a normalized physical distance or temporal distance to the nearest charging/discharging stand from each moving EV user. The temporal distance is calculated based on the shortest route in connection with predicted traffic jam information used in navigation technology.

As an example of a method for ranking by using the aforementioned four items, there is a method of forming a chart to arrange ranks in descending order of area size as shown in FIG. 9 or rankings can be determined in accordance with the area formed by weighting each parameter in accordance with a rule determined in advance in accordance with weather or meteorological conditions. Here, the weighting rule means that, for example, in a day of fine weather that EV users are apt to go out, the cooperation frequency of each EV user is set to be low even when the EV user is near to charging/discharging points, and in a winter season, the amount of chargeable/dischargeable power is set to be low even when the SOC level is high.

Figure 10:
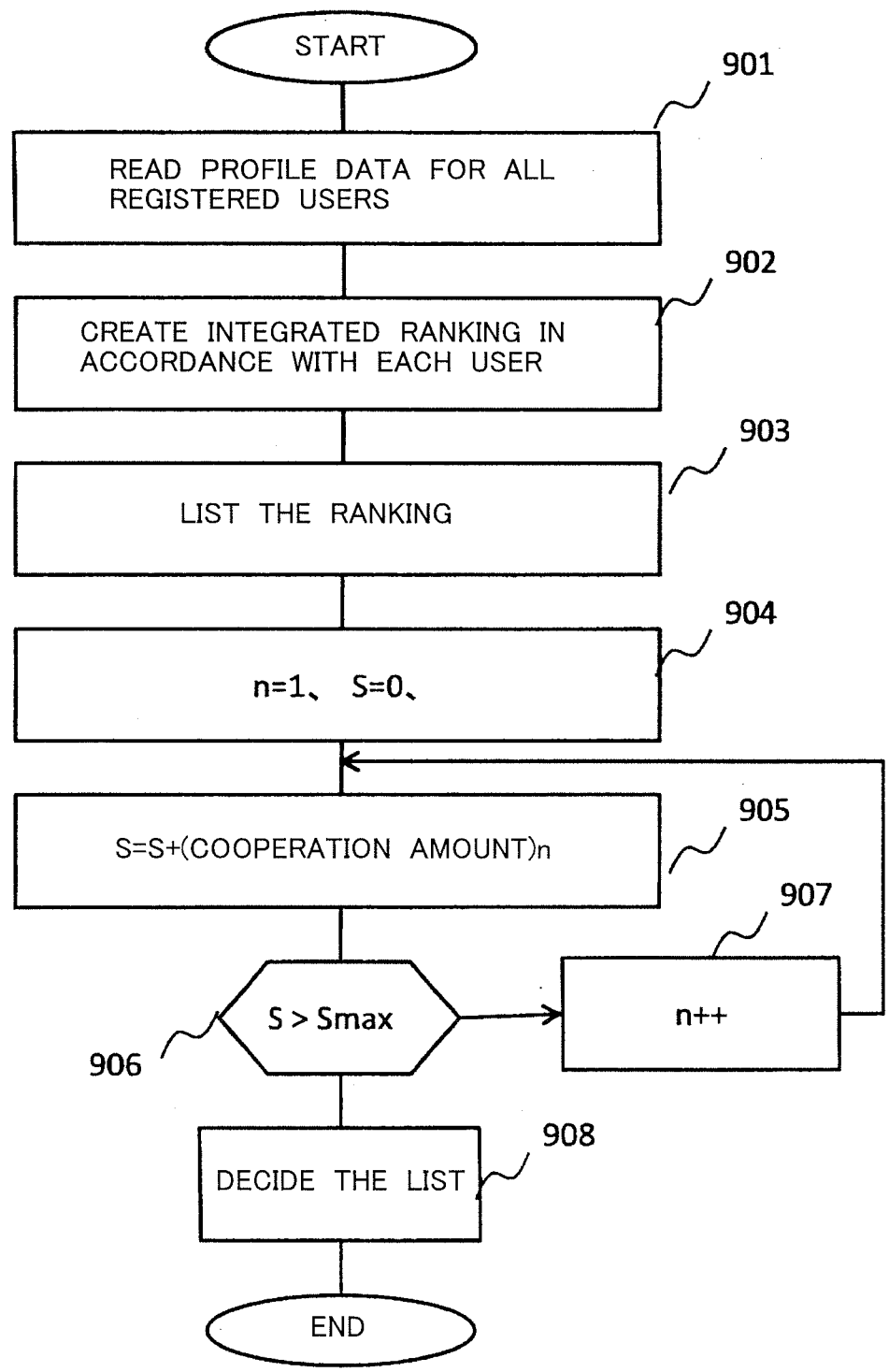
[FIG. 10] A flow chart collectively showing a process of ranking EV users.

FIG. 10 is a flow chart collectively showing a process of ranking EV users. Let Smax be the requested charging/discharging amount from the power feeding command station, and n be the number of EV users registered in the power aggregator. First, the EV user information analyzer 201 creates profile data based on the history database 203 and reads the created profile data (901). Then, the EV user information analyzer 201 creates integrated rankings in accordance with users. The method of creating rankings is as described above (902). Then, the EV user information analyzer 201 creates a list of rankings of users sorted in descending order of value (903). A method of calculating the charging/discharging amounts allocated to respective EV users will be described later. In a process of deciding the user list, variables on calculation are first initialized (903). Then, the charging/discharging amount allocated to each EV user is added to an intermediate variable S in descending order of ranking, and in step 906, determination is made as to whether S is larger than the aforementioned Smax or not (905 and 906). When S is not larger than the aforementioned Smax, a next EV user is selected and processing goes back to step 905 (906 and 907). When the determination in the step 906 results in that S is larger than Smax, the list of cooperative EV users is decided in step 907 and processing is terminated.

Figure 11:
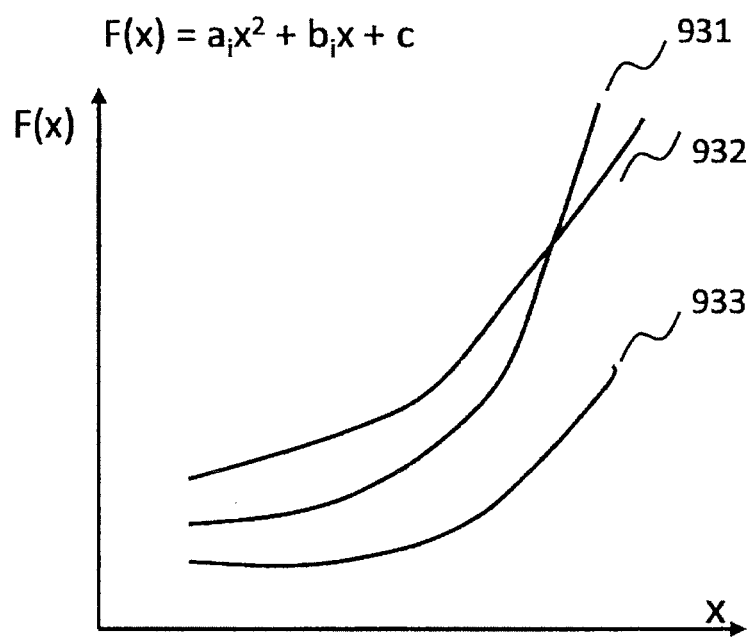
[FIG. 11] A graph for explaining a method of distributing charging/discharging amounts allocated to respective EV users.

FIG. 11 is a graph for explaining the method of distributing charging/discharging amounts allocated to respective EV users. Distribution of charging/discharging amounts into/from storage batteries of respective EVs is performed based on the idea of economic load dispatching in power generator. This is for obtaining the output of each power generator so that the cost (F(x)) is optimized when the output and cost of the power generator are approximated by a quadratic function. However, because there is no function between the output and cost of a storage battery differently from the power generator, it is necessary to create a pseudo function equivalent to the function. Therefore, an expression (1) is set as the aforementioned function.

[Math. 1]

$$F(x)=a_i x^2 + b_i x + c_i \qquad (1)$$

(i: number allocated to each EV)

In this expression, the coefficient $a_i$ is equivalent to the slope of a quadratic curve (efficiency), $b_i$ is equivalent to the moving quantity in an x-axis direction (upper and lower limits of output), and $c_i$ is equivalent to the y-intercept (minimum cost). By considering analogy with the aforementioned parameters, the coefficients are defined here as an example.

$a_i$: price suitability
$b_i$: SOC
$c_i$: distance to the charger

By applying values obtained from the profile database 204 to the aforementioned three kinds of parameters, a relational expression between cost and electric output is created as represented by 931 to 933 in FIG. 11 in the same manner as the economic load dispatching in each power generator, and distribution of required charging/discharging amounts is determined.

Figure 12:
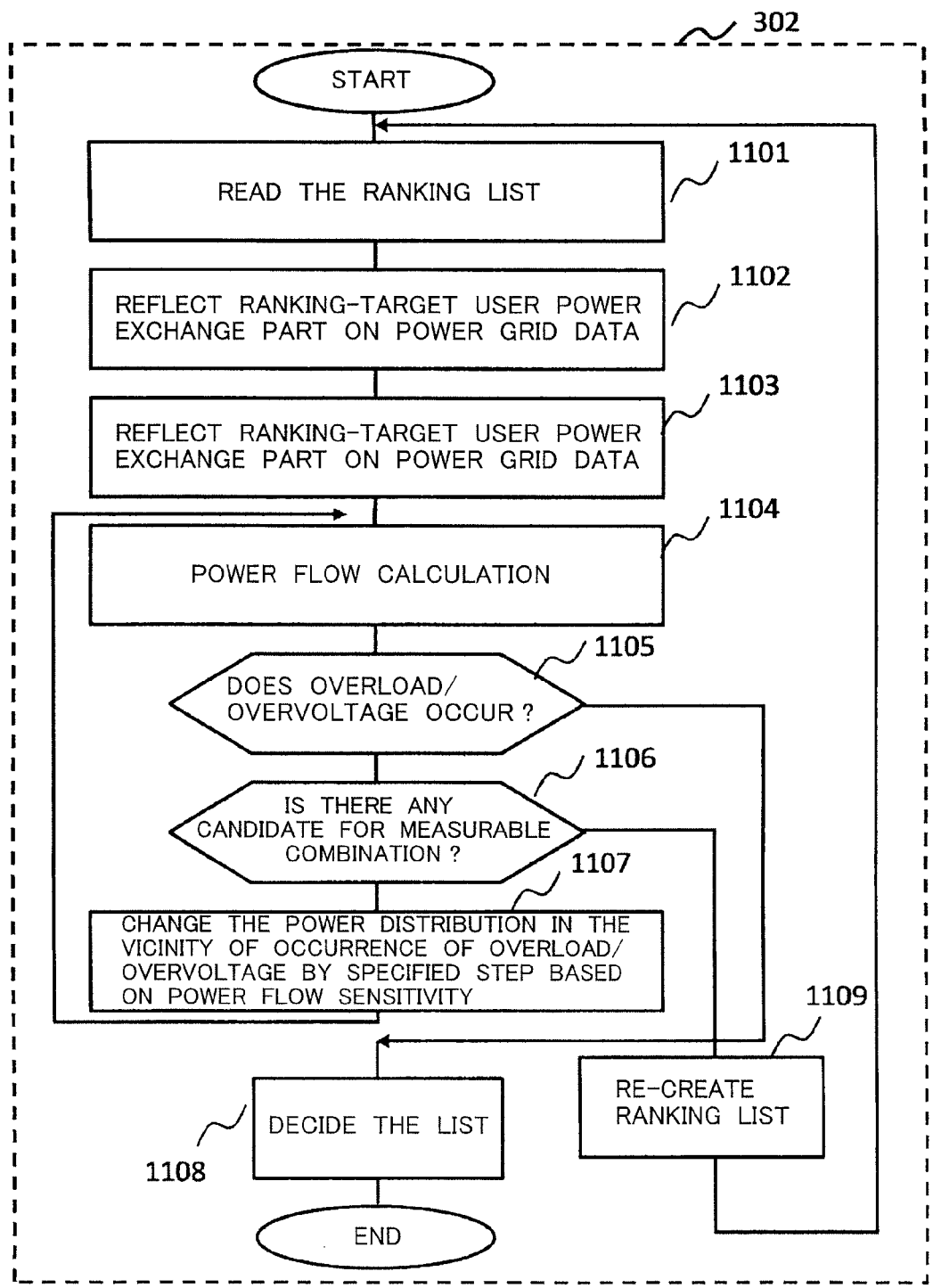
[FIG. 12] A flow chart for explaining processing executed by a V2G controller.

FIG. 12 is a flow chart for explaining processing executed by the V2G controller 302. The V2G controller 302 reads profile data and ranking data from the data center through the communication network 104 (1101). Then, the V2G controller 302 reads power load dispatching amounts of respective EVs calculated by the EV guidance calculator 301 (1102). Then, power load dispatching results of ranking-target users are reflected on power grid data (1103). AC power flow calculation is performed based on the aforementioned data (1104). Incidentally, DC power flow calculation may be used without any problem when only overload of effective power is monitored.

Whether overload/overvoltage occurs or not, is checked based on the power flow calculation result (1105). When there is no occurrence of overvoltage, the list of EVs subjected to charging/discharging and the amounts thereof are decided and processing is terminated (1108). When there is occurrence of overload/overvoltage, whether there is any combination of measurable EVs is calculated (1106). This may be, for example, a measure due to a method of simply increasing/decreasing power amounts of opposite ends where overload occurs, a measure due to calculation based on power flow sensitivity or a measure due to a method of performing calculation by formulation to a large scale optimization problem. If measures are combined here, the power distribution is changed by preset steps by any one of the aforementioned processes and then processing goes back to step 1103 for performing calculation again (1107). When there is no candidate for measurable combination in the step 1106 in the current ranking list, a ranking list is re-created (1109) and processing goes back to step 1101. The ranking list created by the step 1109 is updated in such a manner that the power aggregator reduces price or enlarges the SOC movable regions of top-rank EV users. By performing the aforementioned process, the power aggregator determines the required charging/discharging amount for each EV.

Figure 13:
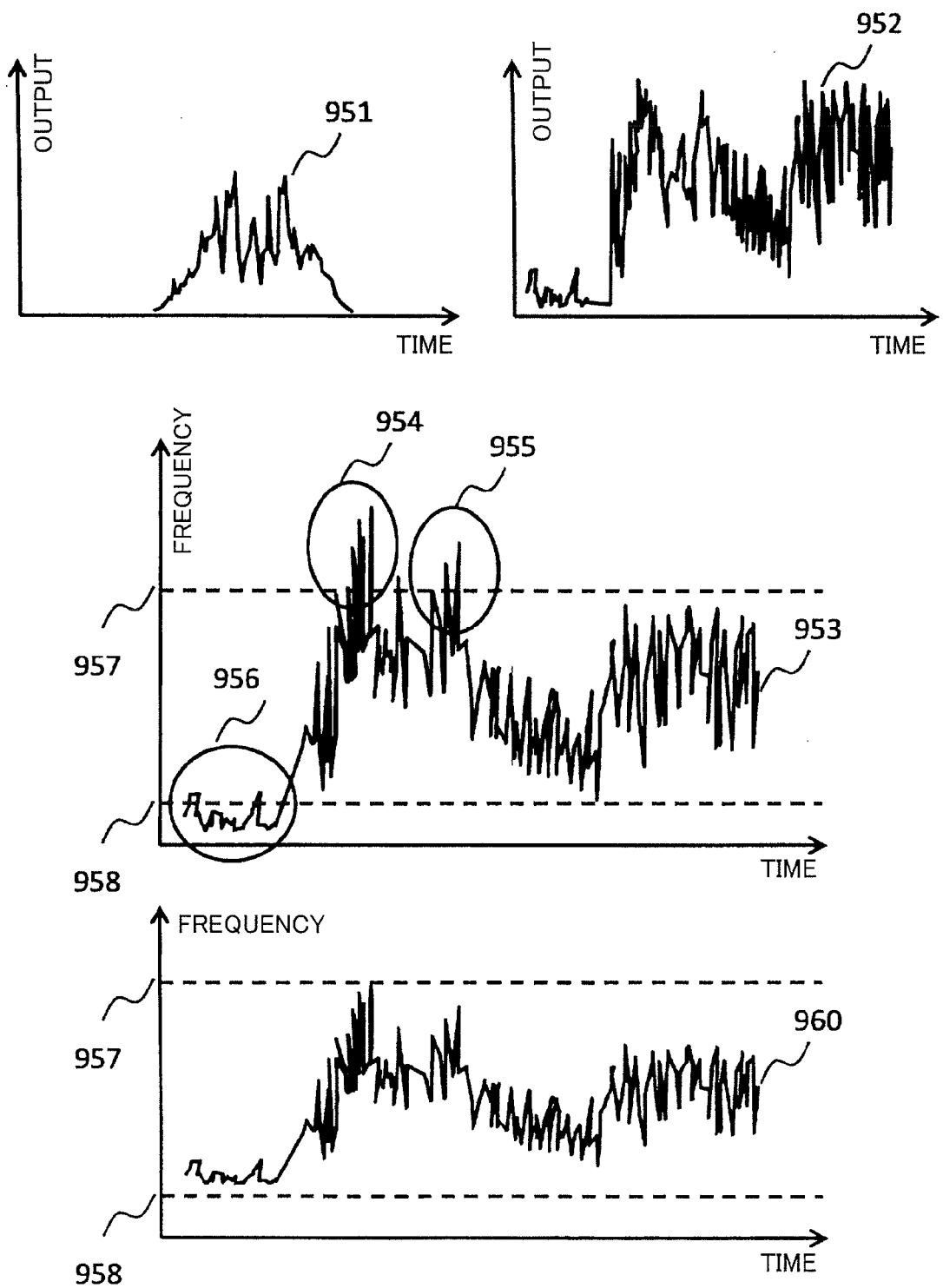
[FIG. 13] A graph showing a state where variation in recyclable energy is relaxed by charging/discharging of EV.
Figure 14:
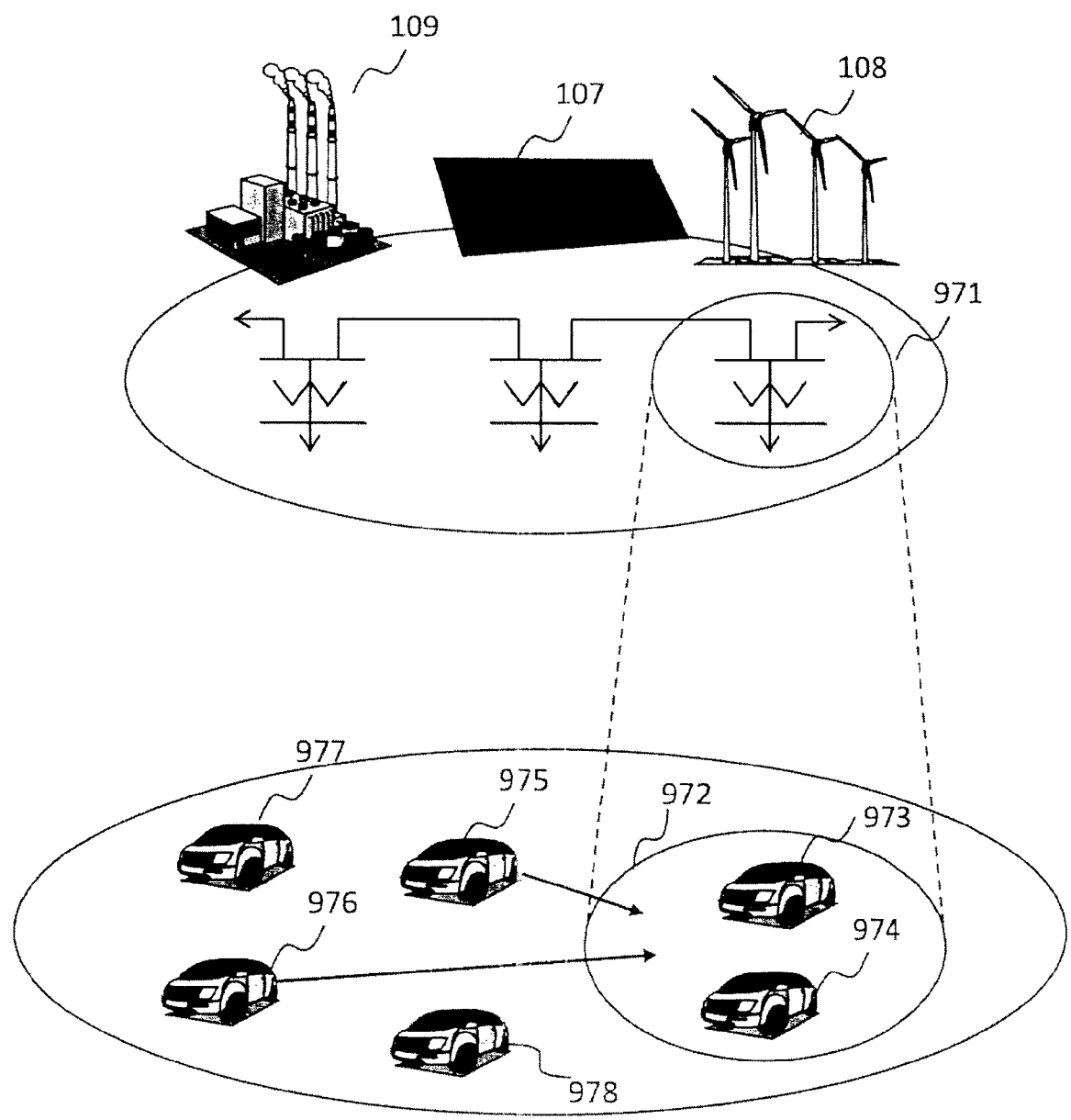
[FIG. 14] A view showing a power grid configuration.

FIG. 13 shows a state where variation in recyclable energy is relaxed by charging/discharging of EV. FIG. 14 is a view showing a power grid configuration on this occasion.

As shown in FIG. 14, the power grid has solar photovoltaic power generation 107, wind power generation 108, large-scale power generation plants of thermal power, nuclear power, etc. Electric vehicles 972 to 9768 are provided on the load side. One power aggregator 103 is provided in a power substation 971. In FIG. 13, 951 shows an example of the amount of power generated by the solar photovoltaic power generation, and 952 shows an example of the amount of power generated by the wind power generation. When these are connected to the power grid for generating power concurrently, the frequency changes as represented by 953 and deviates from the upper and lower limits 957 and 958 of frequency. Such frequency change can be predicted when the output of wind power generation and the output of solar photovoltaic power generation are predicted, that is, when weather is predicted. When it is predicted that the frequency deviates as represented by 954 to 956, power grid control using electric vehicles as shown in FIGS. 1 to 12 permits stabilization of the grid frequency as represented by 960. Incidentally, in the example shown in FIG. 14, EVs 975 and 976 out of the territory of the power aggregator are requested for charging/discharging and the incentive fee paid by the power aggregator is so high that the EVs 975 and 976 are moved from the region out of the territory to a region 971 for charging/discharging.

Two-way communication may be used as a means for transmitting information to the moving EVs or terrestrial digital broadcasting good at mobile reception may be used.

Figure 16:
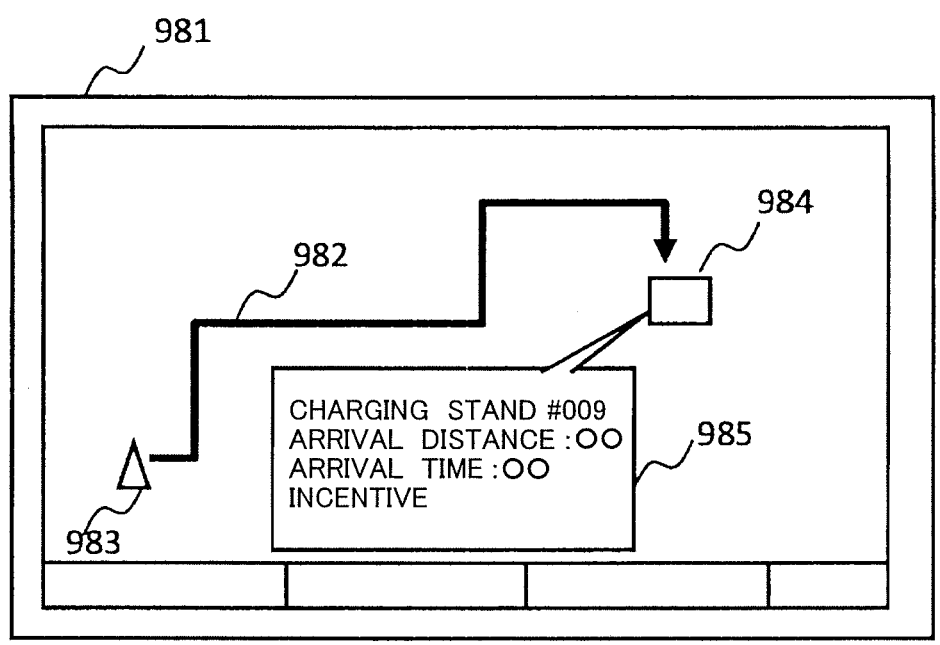
[FIG. 16] A view showing a guidance screen displayed when each EV is guided.

FIG. 16 is a view showing a guidance screen displayed when each EV is guided. As shown in FIG. 16, at least a current position 983, a charging/discharging spot 984 as a destination, a guiding route 982 between the current position and the destination and a pop-up screen 985 for brief description about the destination 984 are displayed on a navigation screen 981. Data such as arrival distance to the charging/discharging spot, arrival time and incentive fee are displayed on the pop-up screen. Incidentally, the guiding route data generated on this occasion are displayed in either manner of distance priority and time priority in accordance with the EV user's preference.

Figure 17:
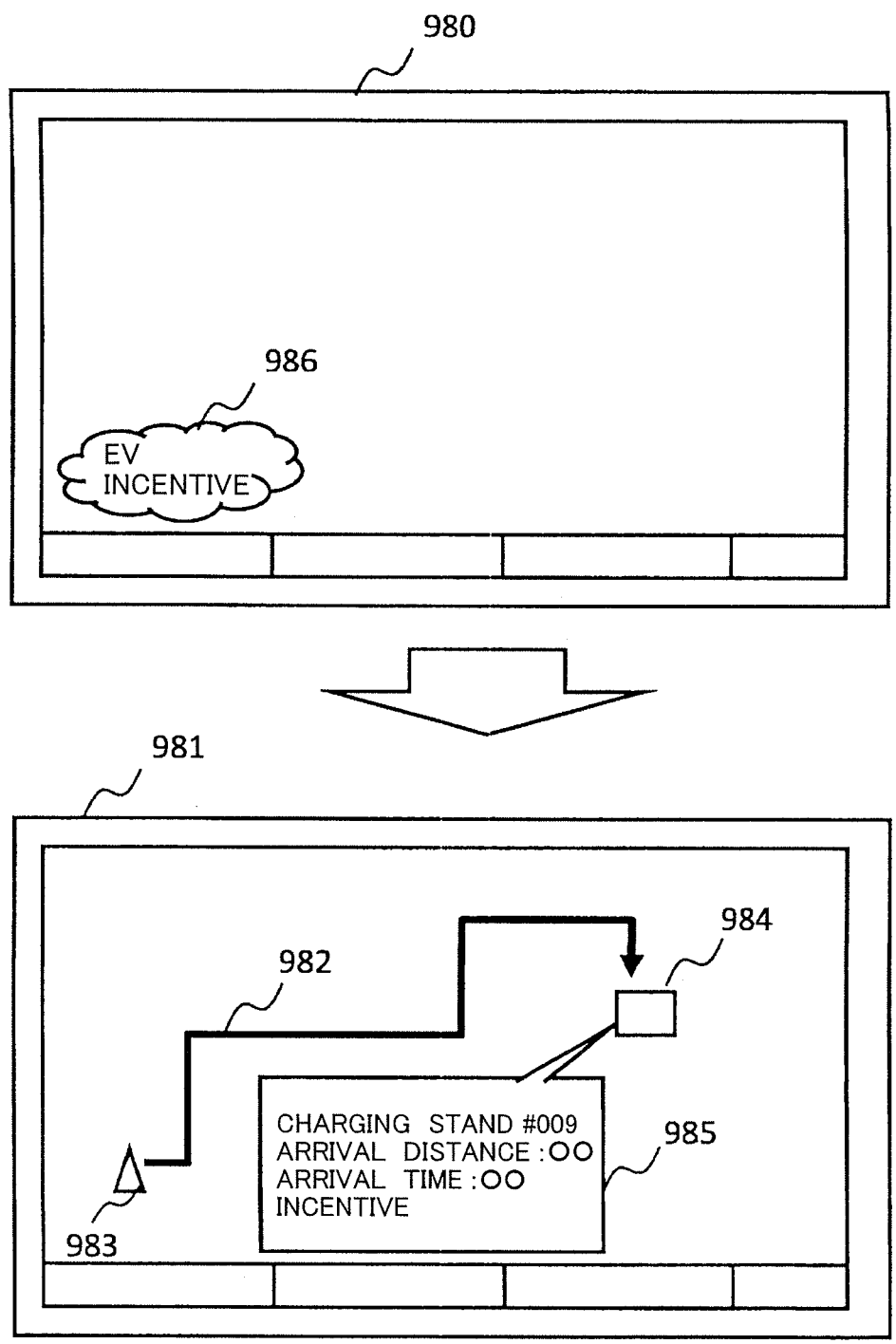
[FIG. 17] A view for explaining the case where a guidance screen is displayed on a terrestrial digital broadcasting screen.

FIG. 17 is a view for explaining the case of display on a terrestrial digital broadcasting screen. As shown in this drawing, a button 986 for guiding incentive information to startup.bml of data broadcasting is disposed on a screen (980) so that the screen is changed to a screen represented by 981 in FIG. 17 when this button 986 is selected.

In the aforementioned embodiment, at least SOC information, price suitability, cooperation frequency and proximity information in each electric vehicle can be used as parameters so that EV users can be ranked. The output distribution of the EV storage battery can be calculated in the same manner as calculation of the distribution of the large-scale power generator, for example, by approximating a cost-output function with parameters shown in the aforementioned expression (1). Accordingly, the grid frequency of the whole power grid can be controlled to be within a reference value and the EV user can enjoy incentive. Moreover, because the electric power company need not place any large-scale power generation plant or any large-scale battery for controlling, both electric power provider and user can reduce the cost. Although the first embodiment has been described in the case where parked EVs and moving EVs are set at targets subjected to charging/discharging, only parked EVs or only moving EVs may be set in the EV guidance calculator 301.

[Embodiment 2]

In a second embodiment, electric power at the time of charging storage batteries of electric vehicles is colored so that coloring data are stored in the data center while results of coloring are held in the EV user information analyzer. To determine power charging/discharging amounts for respective electric vehicles, the charging/discharging amounts are distributed based on the results. Here, coloring of electricity clarifies which energy the charged power derives from, for example, which of nuclear power generation, thermal power generation, hydraulic power generation and recyclable energy represented by solar photovoltaic power generation and wind power generation the charged power derives from. A basic method has been described in detail in the following literature. "Daniel Kirschen, Ron Allan, Goran Strbac, Contributions of Individual Generators to Loads and Flows, IEEE Transactions on Power Systems Vol. 12, No. 1, 1997, 52-60"

Figure 15:
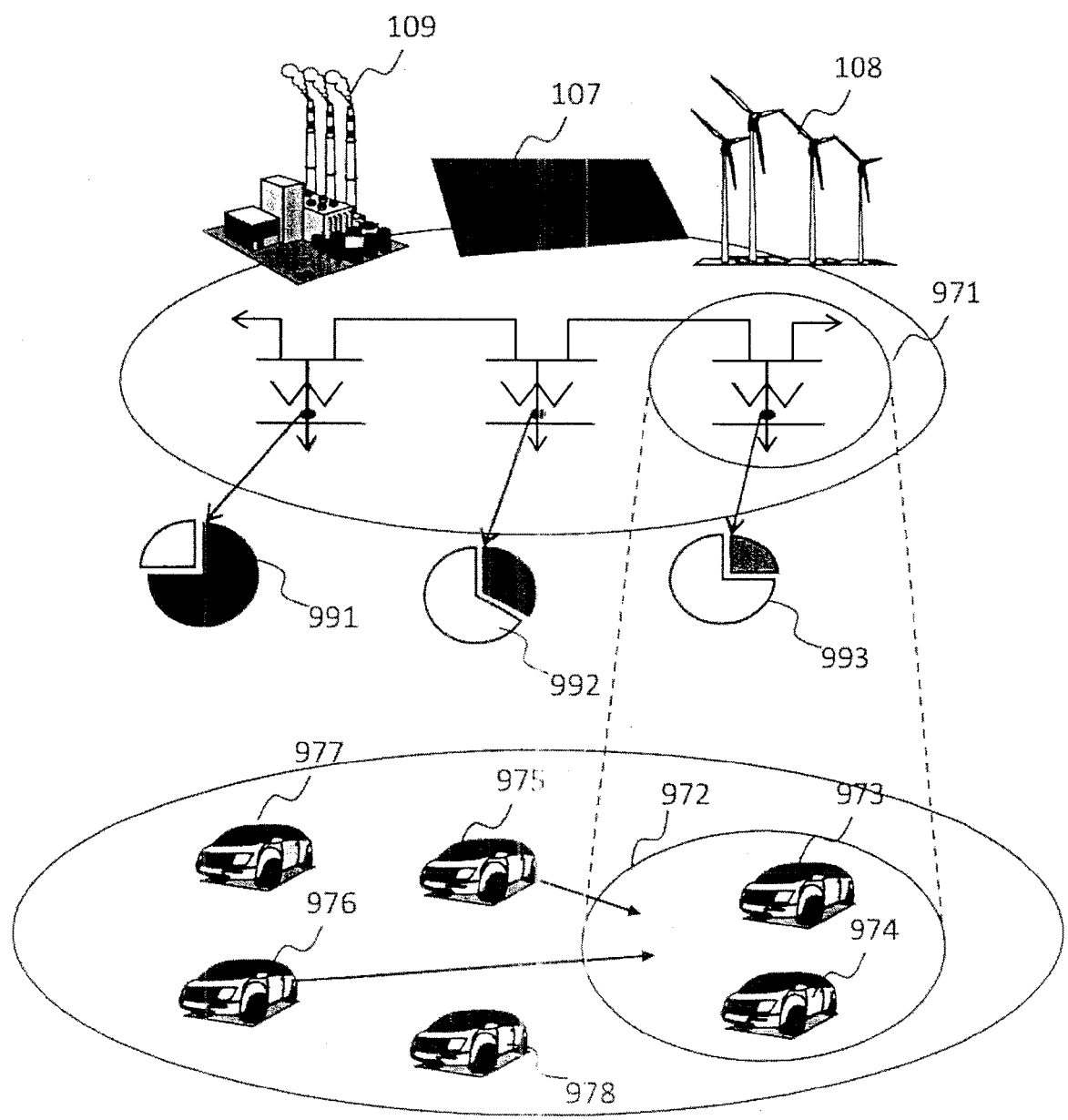
[FIG. 15] A view showing the power grid configuration.
Figure 18:
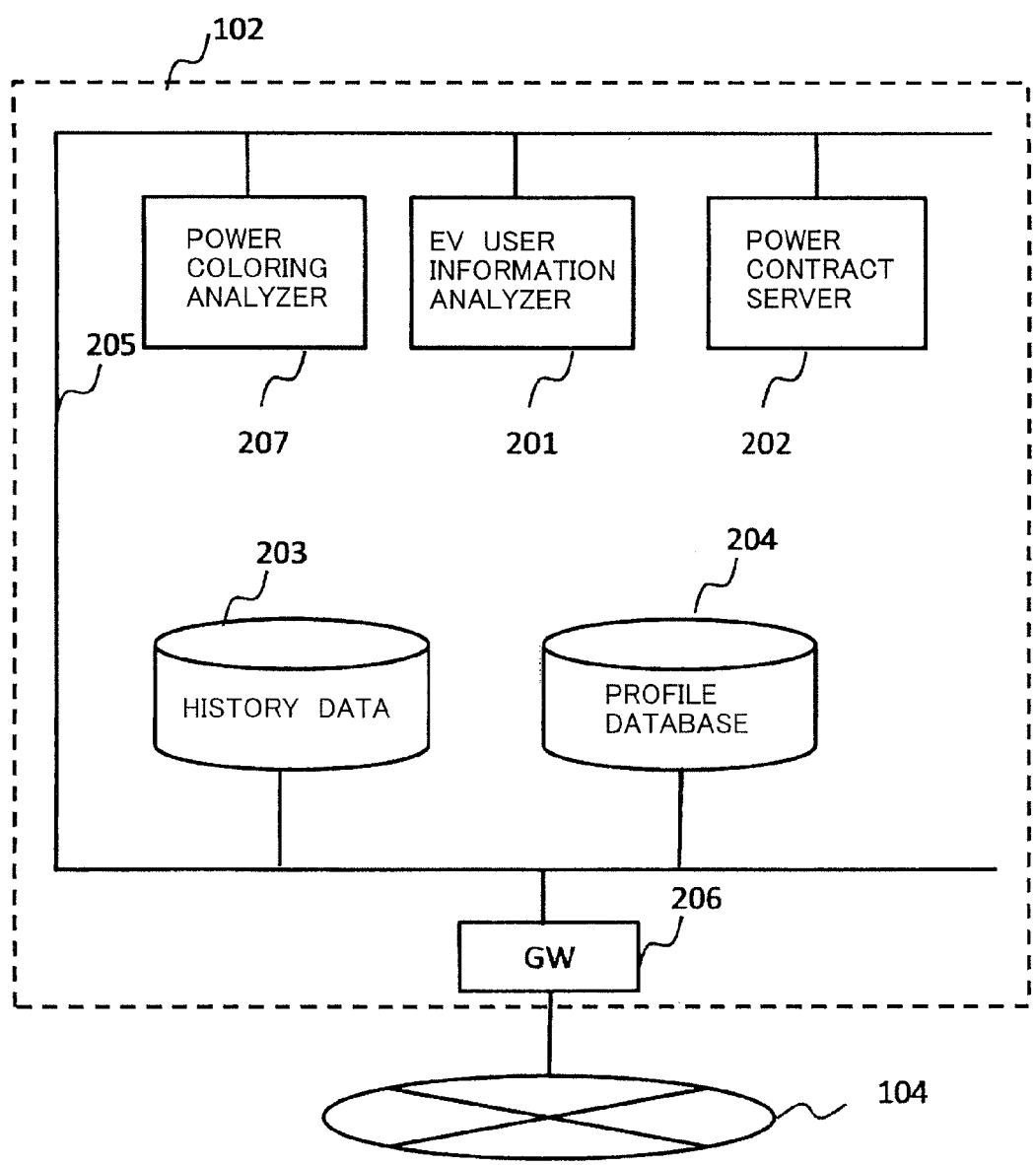
[FIG. 18] A configuration diagram of a data center according to a second embodiment.
Figure 19:
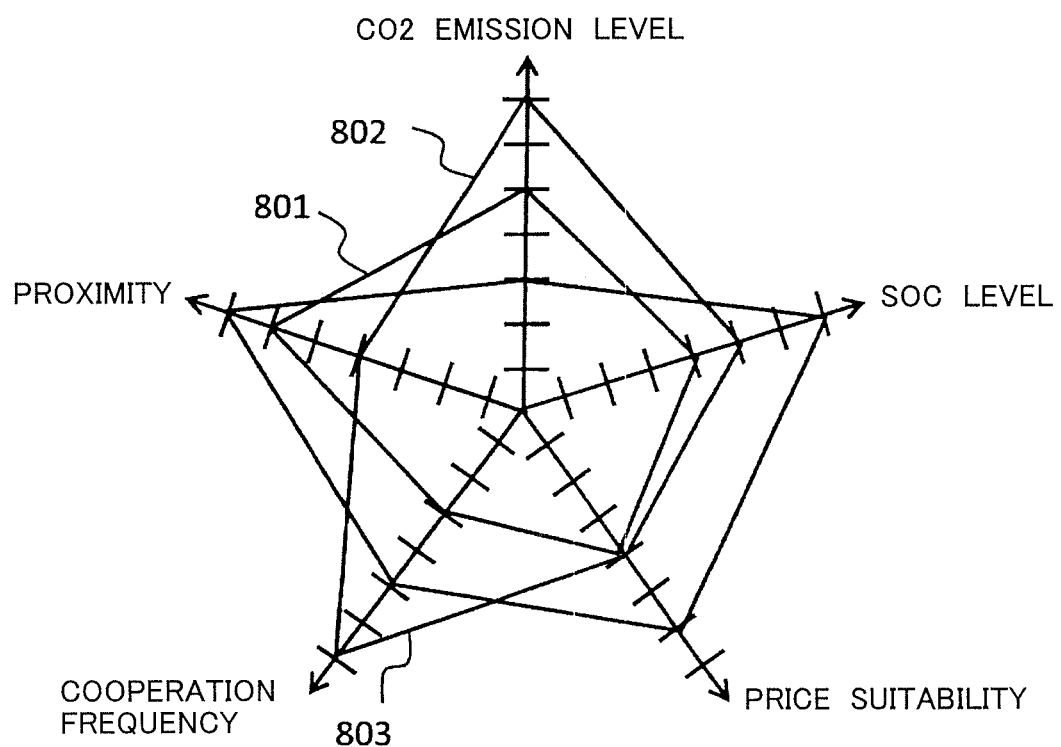
[FIG. 19] A view for explaining a method of ranking EV users by using an EV guidance calculator.

By the method disclosed in the aforementioned literature, an index of CO2 emission degree is provided in the profile data 204. In the example represented by 991 to 993 in FIG. 15, the black sector shows electric power due to fossil fuel-derived energy (high CO2), and the white sector shows recyclable energy-derived energy (low CO2). Results of coloring of electricity are obtained while the secondary power flow of the power substation nearest to the building subjected to charging is set as a target as represented by 791, 792 and 793 in FIG. 15. This function can be implemented by a power coloring analyzer 207 in the data center as shown in FIG. 18. Here, the analysis result is reflected on the EV user information analyzer and reflected on the profile database 204. Guidance calculation processing of running EVs is performed based on this result in the same manner as in Embodiment 1. Parameters corresponding to FIG. 9 on this occasion are shown in FIG. 19. FIG. 19 shows an example in which an index of CO2 emission level is used from the profile database. Incidentally, parameters represented by 801 to 803 are the same as described in FIG. 9.

When the CO2 emission level is added as an index, it is desirable from the viewpoint of minimizing CO2 emission as possible that recyclable energy-derived electric power is used for charging/discharging from EVs based on the results of coloring of electricity. Accordingly, charging/discharging amounts from respective EV storage batteries can be allocated when coefficients in the quadratic function of cost and output quantity shown in FIG. 11 are set in the expression (2) as an example.

[Math. 2]

$$F(x) = a_i x^2 + b_i x + c_i \quad (2)$$

(i: number allocated to each EV)
$a_i$: CO2 emission level
$b_i$: SOC
$c_i$: distance to the charger According to the second embodiment, EV users are ranked using parameters indicating at least SOC information, price suitability, cooperation frequency and proximity in each electric vehicle and the output distribution from EV storage batteries is calculated in the same manner as calculation of the distribution of the large-scale power generator by approximating the cost-output function with parameters shown in the aforementioned expression (2) so that the grid frequency of the whole power grid can be controlled to be within a reference value. Moreover, EV users can enjoy incentive and the electric power company need not place any large-scale power generation plant or any large-scale battery for controlling so that both power provider and user can reduce the total CO2 emission amount.

REFERENCE SIGNS LIST

101 power feeding command station
102 data center
103 power aggregator
104 communication network
105 building
106 electric vehicle
107 solar photovoltaic power generation
108 wind power generation
109 large-scale power generation plant
122 power grid
201 EV user information analyzer
202 power contract server
203 history data
204 profile database
206 gateway
301 EV guidance calculator
302 V2G controller
303 data storage memory
401 watt-hour meter
402 power distribution board
403 PLC main device
404 broad-band modem
405 in-home socket
406 in-home power line
411 PLC extension device
407 PLC interface
408 command interpretation function
409 controller
410 battery

The invention claimed is:

1. A power grid control system using electric vehicles, comprising:
   charging/discharging spots which are connected to a power grid and which charge storage batteries of electric vehicles connected thereto and discharge charged power of the storage batteries to the power grid;
   a data center which collects and stores current position information of electric vehicles located in a territory and charging state information of storage batteries of the electric vehicles; and
   a power aggregator which ranks degrees of necessity of charging/discharging the storage batteries of the respective electric vehicles based on the stored position information, the charging state information of the storage batteries and position information of the charging/discharging spots and creates a ranking list indicating the ranks; wherein
   the power aggregator distributes information for guiding each of the electric vehicles to a designated one of the charging/discharging spots for charging or discharging in accordance with the ranking list.

2. A power grid control system using electric vehicles according to claim 1, wherein the ranking list is calculated in accordance with a history of responses when each electric vehicle is guided to a designated one of the charging/discharging spots for charging/discharging.

3. A power grid control system using electric vehicles according to claim 1, wherein the ranking list is calculated based on at least one of the charging state of the storage battery of each electric vehicle, proximity between the electric vehicle and the charging/discharging spot, the frequency of cooperation for guidance with respect to charging/discharging at the charging/discharging spot from the power aggregator, and a level of CO2 emission.

4. A power grid control system using electric vehicles according to claim 1, wherein the power aggregator calculates a charging/discharging power amount from the storage battery of each electric vehicle based on at least one of price suitability indicating coincidence of power purchase and sale prices between the power aggregator and each electric vehicle user, the charging state of the storage battery mounted in each electric vehicle, a physical distance between the charging/ discharging spot and the electric vehicle, a temporal distance between the charging/discharging spot and the electric vehicle, and a level of CO2 emission.

5. A power grid control system using electric vehicles according to claim 1, wherein the data center has a power analysis coloring device which analyzes a power flow of each power substation near to each electric vehicle and calculates a ratio of power flows derived from various energy sources including fossil fuel, recyclable energy and nuclear power occupied in the power flow, and the power aggregator performs calculation for guiding each electric vehicle to the charging/discharging spot based on the calculated ratio of the power flows derived from the various energy sources.

6. A power grid control system using electric vehicles according to claim 1, wherein the power aggregator displays a designated charging/discharging spot name, distance to the charging spot or arrival time, and price incentive information on a navigation screen of each electric vehicle in real time when information for guiding the electric vehicle to the designated charging/discharging spot for charging or discharging is distributed.

7. A power grid control apparatus using electric vehicles, comprising:
- charging/discharging spots which are connected to a power grid and which charge storage batteries of electric vehicles connected thereto and discharge charged power of the storage batteries to the power grid;
- a data center which collects and stores current position information of electric vehicles located in a territory and charging state information of storage batteries of the electric vehicles; and
- a power aggregator which ranks degrees of necessity of charging/discharging the storage batteries of the respective electric vehicles based on the stored position information, the charging state information of the storage batteries and position information of the charging/discharging spots, creates a ranking list indicating the ranks, and distributes information for guiding each of the electric vehicles to a designated one of the charging/discharging spots for charging/discharging in accordance with the ranking list.

* * * * *